(12) United States Patent
Isoda et al.

(10) Patent No.: US 9,903,365 B2
(45) Date of Patent: Feb. 27, 2018

(54) STRUCTURE FOR FIXING SHAFT MEMBER IN ROTOR MEMBER FOR FLUID PUMP

(71) Applicant: AISIN SEIKI KABUSHIKI KAISHA, Kariya-shi, Aichi (JP)

(72) Inventors: Atsuo Isoda, Toyoake (JP); Fumihiko Toyoda, Nagakute (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 14 days.

(21) Appl. No.: 14/897,309

(22) PCT Filed: Jul. 24, 2014

(86) PCT No.: PCT/JP2014/069554
§ 371 (c)(1),
(2) Date: Dec. 10, 2015

(87) PCT Pub. No.: WO2015/019859
PCT Pub. Date: Feb. 12, 2015

(65) Prior Publication Data
US 2016/0146205 A1    May 26, 2016

(30) Foreign Application Priority Data

Aug. 9, 2013   (JP) ................................. 2013-166897

(51) Int. Cl.
*F03C 2/00*   (2006.01)
*F03C 4/00*   (2006.01)
(Continued)

(52) U.S. Cl.
CPC ................ *F04C 2/10* (2013.01); *F04C 2/102* (2013.01); *F04C 15/0057* (2013.01);
(Continued)

(58) Field of Classification Search
CPC .. F04C 2/084; F04C 2/10; F04C 2/102; F04C 15/0057; F04C 15/0076; F04C 15/0073;
(Continued)

(56) References Cited

U.S. PATENT DOCUMENTS

| 4,595,349 A | 6/1986 | Preston et al. |
| 4,886,392 A | 12/1989 | Iio |

(Continued)

FOREIGN PATENT DOCUMENTS

| DE | 3732223 A1 | 4/1988 |
| JP | 4-234586 A | 8/1992 |

(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Feb. 9, 2016, by the International Bureau of WIPO in corresponding International Application No. PCT/JP2014/069554. (6 pages).

(Continued)

*Primary Examiner* — Theresa Trieu
(74) *Attorney, Agent, or Firm* — Buchanan Ingersoll & Rooney PC (57) ABSTRACT

Provided is a fluid-pump inner rotor that can be easily fitted to an outer rotor. This fluid-pump inner rotor includes a rotor member having a through hole along a rotational axis and a shaft member fitted in the through hole. Fitting strength between a first hole region provided in an inner face of the through hole of the rotor member which region extends along a rotational axis of the rotor member from one of end faces thereof perpendicular to this rotational axis and a first shaft region provided in an outer face of the shaft member is set greater than fitting strength between a second hole (Continued)

region provided in the inner face of the through hole of the rotor member and a second shaft region provided in the outer face of the shaft member.

12 Claims, 4 Drawing Sheets

(51) Int. Cl.
*F04C 2/00* (2006.01)
*F04C 18/00* (2006.01)
*F04C 2/10* (2006.01)
*F04C 15/00* (2006.01)
*F04C 18/10* (2006.01)
*F04C 29/00* (2006.01)

(52) U.S. Cl.
CPC .......... *F04C 15/0076* (2013.01); *F04C 18/10* (2013.01); *F04C 29/0042* (2013.01); *F04C 2240/60* (2013.01)

(58) Field of Classification Search
CPC .. F04C 18/10; F04C 29/0042; F04C 29/0071; F04C 2240/60
USPC .................. 418/166, 171, 182, 206.1–206.9; 464/158, 162, 179; 403/279, 287
See application file for complete search history.

(56) References Cited

U.S. PATENT DOCUMENTS 5,139,395 A   8/1992  Kemmner
6,053,718 A   4/2000  Schmidt et al.

FOREIGN PATENT DOCUMENTS

JP      7-127709 A      5/1995
JP      10-259785 A     9/1998
JP      2010-19205 A    1/2010

OTHER PUBLICATIONS

European Search Report dated Jun. 20, 2016, by the European Patent Office, in corresponding European Patent Application No. 14834936.8 (7 pages).

International Search Report (PCT/ISA/210) dated Oct. 14, 2014, by the Japanese Patent Office as the International Searching Authority for International Application No. PCT/JP2014/069554.

Written Opinion (PCT/ISA/237) dated Oct. 14, 2014, by the Japanese Patent Office as the International Searching Authority for International Application No. PCT/JP2014/069554.

STRUCTURE FOR FIXING SHAFT MEMBER IN ROTOR MEMBER FOR FLUID PUMP

TECHNICAL FIELD

The present invention relates to a fluid-pump inner rotor which is inscribed to an outer rotor in an inscribed gear type fluid pump.

BACKGROUND ART

An inscribed gear type fluid pump, as shown in PTL 1 for instance, employs a combination of an inner rotor and an outer rotor having one more tooth than the inner rotor, with the inner and outer rotor being disposed with offset from each other. A pump rotor is formed generally by sintering. Thereafter, sizing is effected for correcting size and shape.

Such sizing of the pump rotor is effected normally with using a mold comprising a combination of a die, upper and lower punches and a core. In the course of this, as for the inner rotor for example, tooth flanks of outer teeth thereof are abraded (thrusted) by the die, which sometimes can result in reduction in the perpendicularity of the tooth flank of the pump rotor. The language "perpendicularity of the tooth flank" as used herein refers to perpendicularity relative to the end face. Ideally, the end face and the tooth flank form 90 degrees angle therebetween. With reduction in perpendicularity, there can occur instability in the discharging performance and/or the pulsating performance of the fluid pump. Although the perpendicularity of tooth flank can be corrected by e.g. polishing of the tooth flank after sizing, but as this involves the addition of correcting step, manufacturing cost increase will result. For this reason, in the case of the pump rotor described in PTL 1, rather than effecting correction of slope of tooth flank, direction of assembling the outer rotor with the inner rotor is specified, so that appropriate gap may be formed between respective tooth flanks, in an effort of stabilizing discharging performance and pulsating performance.

CITATION LIST

Patent Literature

PTL 1: Japanese Unexamined Patent Publication No. 2010-19205

SUMMARY OF INVENTION

Technical Problem

As described above, in the case of the pump rotor of PTL 1, no correction is made for the perpendicularity of tooth flank. So, if error is made in the assembling direction of the inner rotor relative to the end face of the outer rotor, this will provide adverse effect on the discharging performance and/or pulsating performance. Therefore, for appropriate assembly of the inner rotor, strict management would be required for the assembling direction of the inner rotor relative to the end face of the outer rotor.

The object of the invention is to provide a fluid-pump inner rotor that can be easily fitted to an outer rotor.

Solution to Problem

According to a characterizing feature of a fluid-pump inner rotor relating to the present invention, the fluid-pump inner rotor comprises:

a rotor member having a through hole along a rotational axis; and a shaft member fitted in the through hole;

wherein fitting strength between a first hole region provided in an inner face of the through hole of the rotor member which region extends along a rotational axis of the rotor member from one of end faces thereof perpendicular to this rotational axis and a first shaft region provided in an outer face of the shaft member is set greater than fitting strength between a second hole region provided in the inner face of the through hole of the rotor member and a second shaft region provided in the outer face of the shaft member.

When the through hole of the rotor member and the shaft member of the inner rotor are to be engaged with each other, the outer face of the shaft member will press the inner face of the through hole towards the outer radial side of the rotor member. Therefore, if the pressing force applied from the outer face of the shaft member to the inner face of the through hole is large, this tends to cause a radial enlargement in the rotor member. With the above-described configuration, fitting strength between a first hole region provided in the inner face of the through hole of the rotor member which region extends along the rotational axis of the rotor member from one of end faces thereof perpendicular to this rotational axis and the first shaft region provided in the outer face of the shaft member is set greater than fitting strength between a second hole region provided in the inner face of the through hole of the rotor member and a second shaft region provided in the outer face of the shaft member. With this, a larger pressing force will be applied to the first hole region in the inner face of the rotor member. And, with this application of large pressing force to the first hole region of the inner face of the rotor member, in the outer circumferential face (tooth flank) of the rotor member, the circumferential area of the first hole region will be deformed to bulge outwards. With this, even if there exists a slope relative to the rotational axis in the outer circumferential face of the rotor member prior to engagement with the shaft member, enlargement of the outer diameter of the rotor member provided by increasing the fitting strength of the shaft member relative to the first hole region of the inner face of the through hole on the side of smaller outside diameter of the rotor member can lessen such slope existent in the outer circumferential face. As a result, performance variation due to an error in the assembling direction of the inner rotor relative to the outer rotor is reduced, and it becomes possible to assemble the inner rotor to the outer rotor from either end face.

Further, thanks to lessening of reduction of the perpendicularity of the tooth flank (outer circumferential face) of the rotor member, failure or trouble in the engagement between the outer rotor and the inner rotor will occur less frequently, and generation of noise too will be restricted.

According to a characterizing feature of the fluid-pump inner rotor relating to the present invention, the first shaft region includes in a circumferential direction a serration portion having a plurality of groove portions extending along the direction of the rotational axis.

With the above-described configuration in which the first shaft region includes in a circumferential direction a serration portion having a plurality of groove portions extending along the direction of the rotational axis, the radial enlargement of the rotor member can be realized with utilization of a pressing force applied from the serration portion. As a result, there is realized stable engagement between the rotor member and the shaft member, which sable engagement reliably prevents relative rotation between the rotor member and the shaft member.

According to a characterizing feature of the fluid-pump inner rotor relating to the present invention, the shaft member can be inserted into the through hole from one direction; and in the second shaft region, there is formed a guide portion which is inserted into the through hole prior to the serration portion and which is formed at an area which can come into contact with the inner face of the through hole simultaneously with at least a part of the serration portion when the shaft member is engaged and assembled to the rotor member.

For proper engagement of the shaft member relative to the through hole, it is necessary to center the shaft member into alignment with the axis of the through hole. Then, in the above-described arrangement, a guide portion is formed in the second shaft region of the outer face of the shaft member. And, this guide portion is inserted into the through hole prior to the serration portion and is formed at an area which can come into contact with the inner face of the through hole simultaneously with at least a part of the serration portion at the time of fitting and engaging the shaft member to the rotor member. With this arrangement, when the shaft member is to be engaged and assembled to the rotor member, the guide portion will guide engagement between the serration portion and the inner face of the through hole. As a result, the centering of the shaft member can be carried out in a reliable manner.

According to a characterizing feature of the fluid-pump inner rotor relating to the present invention, the guide portion comprises a cylindrical face formed around the rotational axis.

With the above-described configuration, since the guide portion comprises a cylindrical face formed around the rotational axis, working for forming the guide portion can be made easily and also the centering of the shaft member relative to the through hole can be carried out reliably.

According to a characterizing feature of the fluid-pump inner rotor relating to the present invention:

a stepped portion is provided between the first hole region and the second hole region;

in the second shaft region, there is formed a guide portion which is inserted into the through hole prior to the serration portion and which is formed at an area which can come into contact with the inner face of the through hole simultaneously with at least a part of the serration portion when the shaft member is engaged and assembled to the rotor member; and an inside diameter of the second hole region is greater than an outside diameter of the guide portion.

According to a characterizing feature of the fluid-pump inner rotor relating to the present invention, the guide portion is tapered such that its diameter progressively decreases toward a leading end of the shaft member.

According to a characterizing feature of the fluid-pump inner rotor relating to the present invention, the serration portion is tapered such that its diameter progressively decreases toward a leading end of the shaft member.

According to a characterizing feature of the fluid-pump inner rotor relating to the present invention, the serration portion is tapered such that its diameter step-wisely decreases toward a leading end of the shaft member.

According to a characterizing feature of the fluid-pump inner rotor relating to the present invention:

the rotor member comprises a sintered body;

radial enlargement of the rotor member occurs as a result of the engagement of the shaft member; and outside-diameter sizes of opposed faces of the rotor member are equal to each other.

If the rotor member is comprised of a sintered body, it is possible to reduce the amount (or number of steps) of machining process, so that waste of material and energy consumption at the time of forming can be restricted. Yet, with such rotor member comprised of a sintered body, the shape of tooth flank (outer circumferential face) will be tapered with slope relative to the direction of the rotational axis, due to the releasing slope of the mold employed at the time of sizing operation. Therefore, in order to eliminate such tapering of the tooth flank, an additional work is needed. On the other hand, in the case of the above-described configuration, the rotor member is comprised of a sintered body, yet, an arrangement is provided such that radial enlargement of the rotor member occurs as a result of the engagement of the shaft member and outside-diameter sizes of opposed faces of the rotor member are equal to each other. With this arrangement, such additional work for the tooth flank becomes unnecessary. As a result, the manufacturing cost of the inner rotor can be reduced.

DESCRIPTION OF EMBODIMENTS

Next, embodiments of a fluid-pump inner rotor relating to the present invention will be explained with reference to the accompanying drawings.

Figure 1:
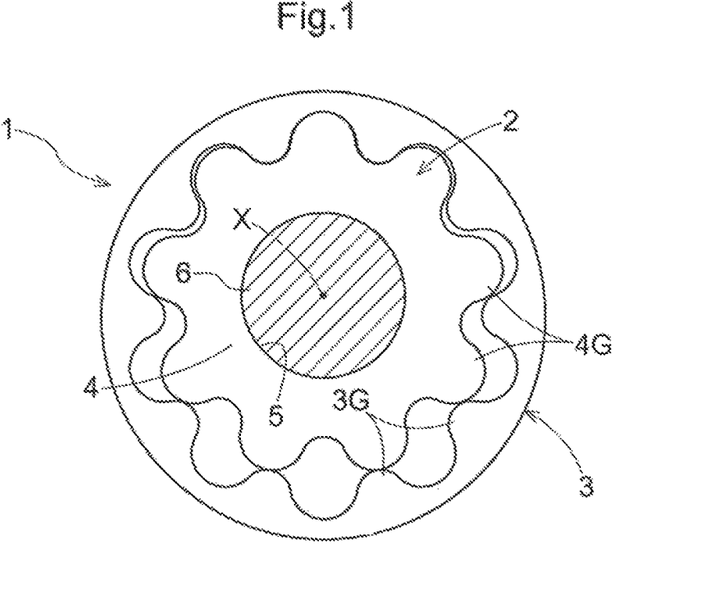
FIG. 1 is an end view showing an example of a fluid-pump rotor.

A fluid-pump rotor 1 shown in FIG. 1 comprises an assembly of an inner rotor 2 and an outer rotor 3 which respectively are formed by sintering. The inner rotor 2 includes a rotor member 4 having a through hole 5 extending along a rotational axis X and a shaft member 6 to be fitted in the through hole 5. A toothed portion 4G formed on the outer circumference of the rotor member 4 is to be meshed with a toothed portion 3G formed in the inner circumference of the outer rotor 3. The outer rotor 3 used herein has one more tooth than the inner rotor 2.

The rotor member 4 of the inner rotor 2 and the outer rotor 3 are assembled with an offset from each other, thus constituting the fluid-pump rotor 1 together. For instance, this fluid-pump rotor 1 will be accommodated in a pump case (not shown) having an inlet port and a discharge port, thus constituting an inscribed gear pump. With this inscribed gear pump, the shaft member 6 is engaged in the through 5 of the rotor member 4, so that rotational drive force of the shaft member 6 rotates the rotor member 4 of the inner rotor 2. In this, the outer rotor 3 will be driven to rotate, which rotation in turn causes increase/decrease of the volume of a pump chamber formed between the rotor member 4 of the inner rotor 2 and the outer rotor 3, thus effecting introduction/ discharge of a fluid such as an oil.

Figure 2:
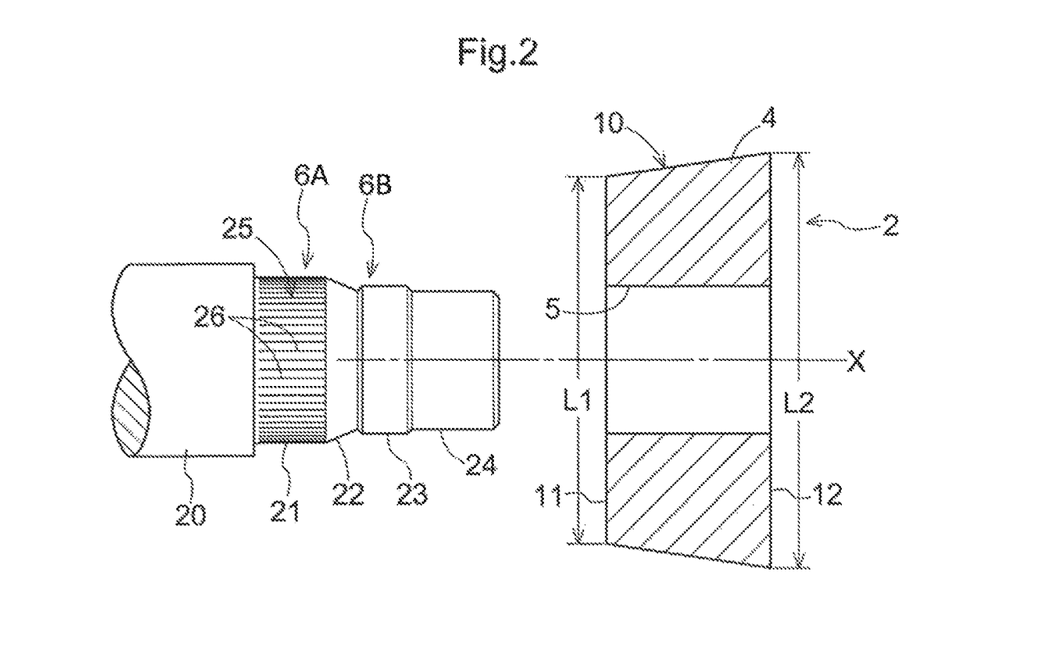
FIG. 2 is a view showing a state prior to engagement of a shaft member to a rotor member.
Figure 3:
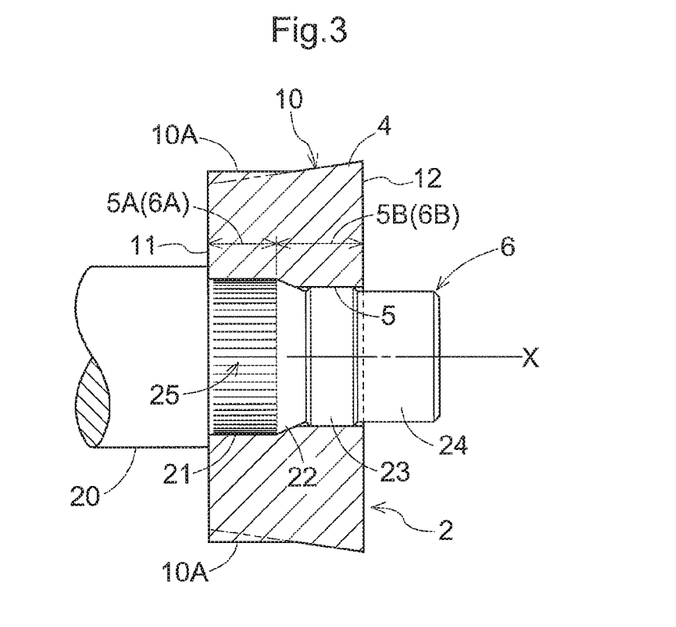
FIG. 3 is a view showing a state in which the shaft member is engaged to the rotor member.

As shown in FIG. 2 and FIG. 3, the inner rotor 2 is configured with the shaft member 6 engaged to the rotor member 4. Referring to the rotor member 4, the outer circumferential face forming the toothed portion 4G has a tapered shape inclined relative to the direction of the rotational axis X of the rotor member 4. Therefore, in the outer circumferential face 10, an outside diameter size L1 of one end face 11 perpendicular to the rotational axis X is smaller than an outer diameter size L2 of the other end face 12.

The shaft member 6 is configured to be insertable into the through hole 5 from the side of the smaller outside diameter side end face of the rotor member 4 (i.e. from the side of the end face 11). The shaft member 6 is provided in a shaft member body 20 and includes a large diameter portion 21, a tapered portion 22, a guide portion 23 and a small diameter portion 24 formed continuously one after another along the rotational axis X from the side of the shaft member body 20 toward the leading end. In the large diameter portion 21 (a partial region 6A of the outer face of the shaft member 6), a serration portion 25 is formed. This serration portion 25 includes a plurality of groove portions 26 in the circumferential direction along the direction of the rotational axis X. The outside diameter of the large diameter portion 21 is greater than the outside diameter of the guide portion 23 and also than the outside diameter of the small diameter portion 24. The partial region 6A is an example of what is referred to herein as "a first shaft region".

As shown in FIG. 3, when the shaft member 6 is inserted into the through hole 5 from the side of the one end face 11 of the rotor member 4, engagement is established between a partial region 5A of the inner face of the through hole 5 extending from the one end face 11 along the rotational axis X and the partial region 6A of the outer face of the shaft member 6 and engagement is also established between a remaining region 5B of the inner face of the through hole 5 and the other region 6B of the outer face of the shaft member 6. In the other region 6B lacking the serration portion 25 in the outer face of the shaft member 6, at least the guide portion 23 is included. The guide portion 23 and the small diameter portion 24 will be inserted into the through hole 5 prior to the serration portion 25. The region where the guide portion 23 is formed is a region which can come into contact with the inner face of the through hole 5 simultaneously with at least part of the serration portion 25 when the shaft member 6 is to be engaged and assembled to the rotor member 4. Incidentally, the partial region 5A is one example of "a first hole region" and the remaining region 5B is an example of "a second hole region" and the other region 6B is one example of "a second shaft region", respectively.

The guide portion 23 is a cylindrical face of the rotor member 4 formed about the rotational axis X. If the guide portion 23 is formed as such cylindrical face as described above, the work for forming the guide member 23 can be made simple and also centering of the shaft member 6 relative to the through hole 5 can be carried out in a reliable manner.

Upon establishment of engagement between the through hole 5 of the rotor member 4 of the inner rotor 2 and the shaft member 6, the outer face of the shaft member 6 presses the inner face of the through hole 5 towards the outer circumferential side of the rotor member 4. Therefore, the greater the pressing force applied from the outer face of the shaft member 6 to the inner face of the through hole 5, the easier the radial enlargement of the rotor member 4. As described above, the outside diameter of the large diameter portion 21 is greater than the outside diameter of the guide portion 23 and also than the outside diameter of the small diameter portion 24. For this reason, the fitting strength between the partial region 5A in the inner face of the through hole 5 from either one face of the rotor member 4 along the rotational axis X and the partial region 6A of the outer face of the shaft member 6 is greater than the fitting strength between the remaining region 5B of the inner face of the through hole 5 and the other region 6B of the outer face of the shaft member 6.

As the partial region 5A of the inner face of the though hole 5 of the rotor member 4 is exposed to a greater pressing force than the remaining region 5B of the same, there occurs deformation in the outer circumferential face (tooth flank) 10 of the rotor member 4 in which an area 10A on the circumferential side of the partial region 5A bulges to the outer side (see FIG. 3). With this, even when there exists a slope in the outer circumferential face 10 in the rotor member 4 prior to engagement with the shaft member 6 relative to the rotational axis X, as the outside diameter of the rotor member 4 can be increased by the increased fitting strength of the shaft member 6 relative to the partial region 5A of the inner face of the though hole 5 on the smaller outside diameter side of the rotor member 4, such slope of the outer circumferential face 10 can be lessened. Consequently, there will occur less variation in the performance due to error in the assembling direction of the inner rotor 2 relative to the outer rotor 3, so that the inner rotor 2 can be assembled to the outer rotor 3 from either end face.

For instance, it is possible to form the rotor member 4, based on the relative relation between the fitting strength of the engagement portion between the inner face of the through hole 5 and the outer face of the shaft member 6 and the outward bulging amount of the outer circumferential face 10 of the rotor member 4 at the time of the engagement between the through hole 5 and the shaft member 6. With such adjustment of the deformation amount of the outer circumferential face 10 of the rotor member 4 via the fitting strength between the shaft member 6 and the through hole 5, even when the releasing slope of the mold used for forming the rotor member 4 is made large, the rotor member 4 can be formed such that reduction in the perpendicularity of the tooth flank (outer circumferential face) 10 may be lessened sufficiently. As a result, it becomes possible to manufacture a rotor member 4 having greater thickness. Further, with the realization of reduction in the perpendicularity of the tooth flank (outer circumferential face) 10 of the rotor member 4, engagement failure or problem between the outer rotor 3 and the inner rotor 2 will be made to occur less frequently and generation of noise can also be suppressed.

With the above-described formation of the serration portion 25 having the plurality of groove portions 26 in the circumferential direction along the direction of the rotational axis X in the partial region 6A included in the shaft member 6, radial enlargement of the rotor member 4 is made possible with utilization of the pressing force applied from this serration portion 25, so that the rotor member 4 and the shaft member 6 will be engaged and retained to each other in a stable manner. With this, relative rotation between the rotor member 4 and the shaft member 6 can be prevented reliably.

Further, in this instant embodiment, the guide portion 23 is formed in the other region 6B in the outer face of the shaft member 6. This guide portion 23 is to be inserted into the through hole 5 prior to the serration portion 25 and is formed at the region which can come into contact with the inner face of the through hole 5 simultaneously with at least a part of the serration portion 25 at the time of engaging and fitting the shaft member 6 to the rotor member 4. With this arrangement, when the shaft member 6 is to be engaged and assembled to the rotor member 4, the guide portion 23 guides the fitting between the serration portion 25 and the inner face of the through hole 5, whereby centering of the shaft member 6 relative to the through hole 5 can be carried out in a reliable manner.

If the rotor member 4 is comprised of a sintered body, it is possible to reduce the amount (or number of steps) of machining process, so that waste of material and energy consumption at the time of forming can be restricted. Yet, with such rotor member 4 comprised of a sintered body, the shape of tooth flank (outer circumferential face) 10 will be tapered with slope relative to the direction of the rotational axis X, due to the releasing slope of the mold employed at the time of sizing operation. Therefore, in order to eliminate such tapering of the tooth flank, an additional work is needed. On the other hand, in the case of the above-described configuration, the rotor member 4 is comprised of a sintered body, yet, arrangement is provided such that radial enlargement of the rotor member 4 occurs as a result of the engagement of the shaft member 6 and outside-diameter sizes L1, L2 of opposed faces of the rotor member 4 are equal to each other. With this arrangement, such work for the tooth flank (outer circumferential face) 10 becomes unnecessary. As a result, the manufacturing cost of the inner rotor 2 can be reduced.

Other Embodiments (1) In the foregoing embodiment, the inside diameter of the through hole 5 of the rotor member 4 is made approximately constant, so that the shaft member 6 is engaged with the through hole 5 of the rotor member 4 over the whole region along the rotational axis X. For this reason, at the partial region 5A of the through hole 5, high precision will be required for obtaining a predetermined deformation amount in the outer circumferential face 10 of the rotor member 4 and high precision will be required also in the remaining region 5B in order to suppress the deformation amount of the outer circumferential face 10 of the rotor member 4. However, with an alternative arrangement for avoiding contact between the remaining region 5B of the through hole 5 and the other region 6B of the shaft member 6, such region in the through hole 5 that requires high manufacture precision can be limited to the partial region 5A.

Figure 4:
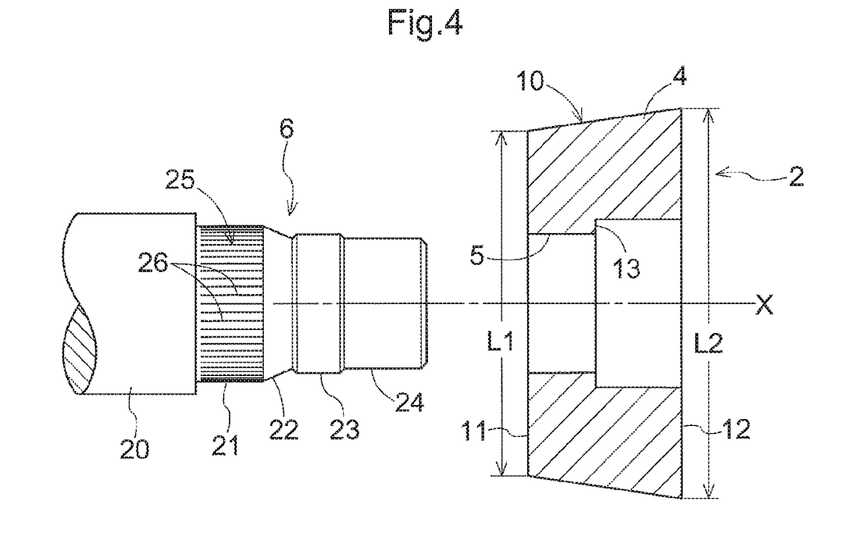
FIG. 4 is a view showing a state prior to engagement of a shaft member to a rotor member in a further embodiment.

Specifically, as shown in FIG. 4, the through hole 5 is configured such that a stepped portion 13 is provided between the partial region 5A and the remaining region 5B of the through hole 5, such that the inside diameter of the other region 5B may be greater than the outside diameter of the guide portion 23 of the shaft member 6. With this arrangement, the partial region 6A of the shaft member 6 will be engaged with the partial region 5A of the through hole 5 and a gap S will be formed between the other region 6B of the shaft member 6 and the remaining region 5B of the through hole 5 (see FIG. 5).

Figure 5:
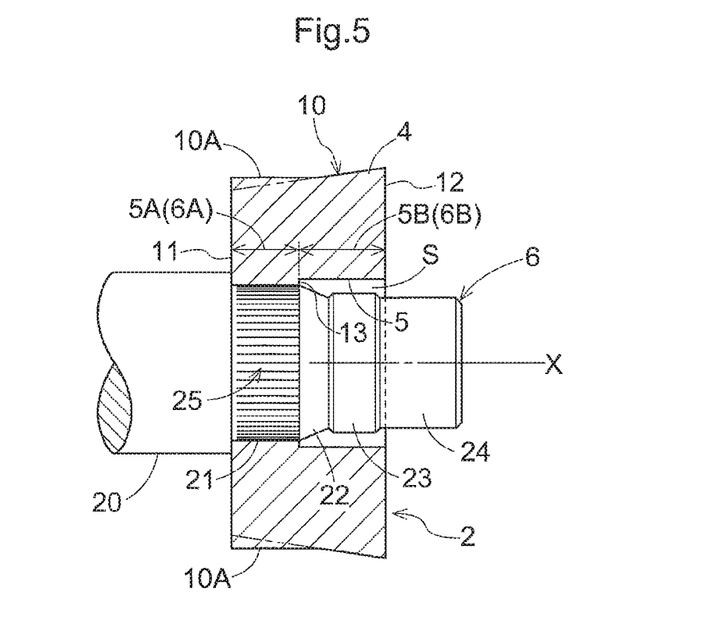
FIG. 5 is a view showing a state in which the shaft member is engaged to the rotor member in the further embodiment.

With the above-described arrangement of decreasing or limiting the region requiring high precision in the through hole 5, the forming work of the through hole 5 can be made simple. As no contact occurs between the remaining region 5B of the through hole 5 and the other region 6B of the shaft member 6, in the rotor member 4, no deformation of the outer circumferential face 10 on the circumferential side of the remaining region 5B occurs. That is, in the outer circumferential face 10 of the rotor member 4, only the area 10A on the circumferential side of the partial region 5A will bulge to the outer side. With this, correction degree of the shape of the outer circumferential face 10 can be enhanced, whereby the slope if any in the outer circumferential face 10 may be lessened easily. Moreover, due to the presence of the stepped portion 13, the through hole 5 is provided with a side having a larger hole diameter and a side having a smaller hole diameter, which diameter difference facilitates visual recognition of the inserting direction of the shaft member 6 relative to the through hole 5 of the rotor member 4. Incidentally, the stepped portion 13 to be provided in the through hole 5 can be formed between the area occupied by the tapered portion 22 and the area occupied by the guide portion 23, rather than between the partial region 5A and the remaining region 5B.

(2) In the foregoing embodiment, there was shown an example in which the rotor member 4 of the inner rotor 2 is comprised of a sintered body. Instead, the rotor member 4 can be formed of any other member than such sintered body.

Figure 6:
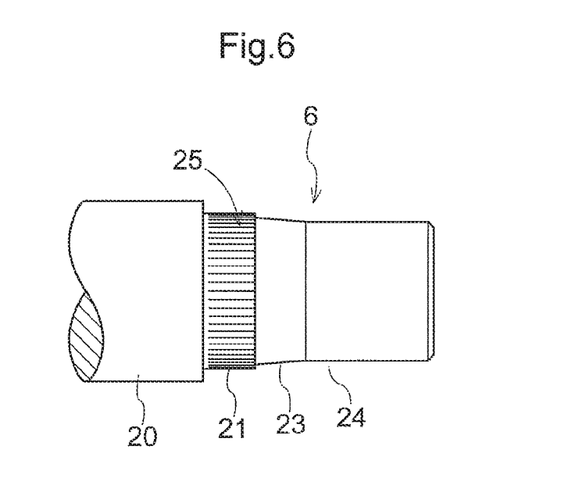
FIG. 6 is a side view of a shaft member according to a further embodiment.

(3) In the foregoing embodiment, there was shown an example in which the guide portion 23 of the shaft member 6 is formed cylindrical toward the small diameter portion 24. Instead, as shown in FIG. 6, the guide portion 23 can be tapered with progressively decreasing diameter toward the small diameter portion 24, that is, toward the leading end of the shaft member 6.

Figure 7:
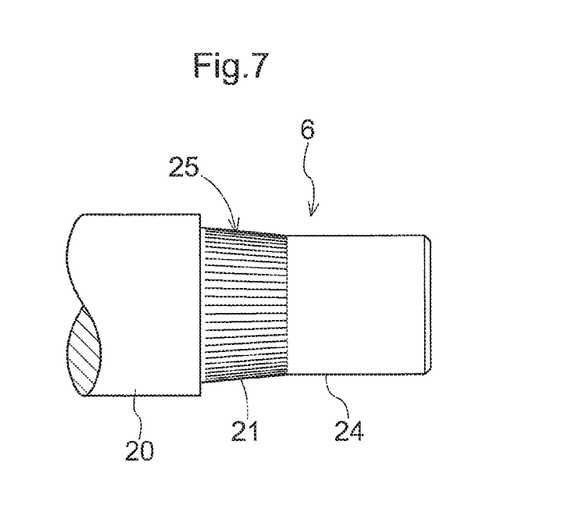
FIG. 7 is a side view of a shaft member according to a further embodiment.
Figure 8:
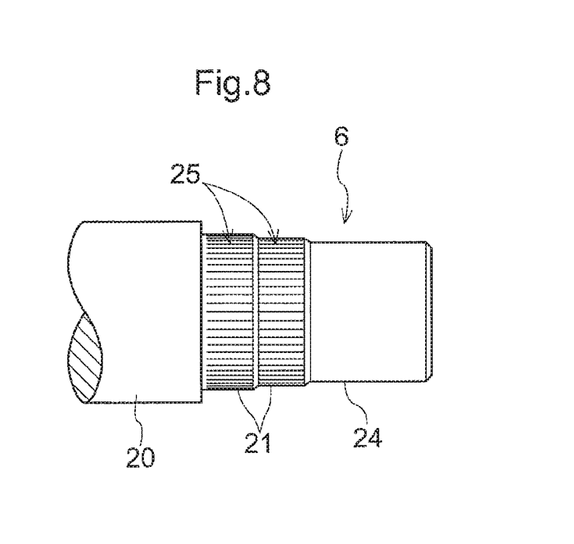
FIG. 8 is a side view of a shaft member according to a further embodiment.

(4) The shaft member 6 can be comprised of the large diameter portion 21 and the small diameter portion 24, without the guide member 23. In such case, the serration portion 25 to be formed in the large diameter portion 21 can be tapered with its diameter progressively decreased toward the small diameter portion 24, that is, toward the leading end of the shaft member 6 as shown in FIG. 7. Further, as shown in FIG. 8, the serration portion 25 may be formed such that its diameter step-wisely decreases toward the small diameter portion 24, that is, toward the leading end of the shaft member 6.

(5) In the foregoing embodiment, there was shown an example in which the serration portion 25 is formed in the large diameter portion 21 of the shaft member 6. Instead, the large diameter portion 21 can be formed as a cylindrical face having no serration portion 25.

(6) In the foregoing embodiment, the diameter of the partial region 6A in the shaft member 6 is made larger than the diameter of the other region 6B of the same, thus setting the fitting strength of the through hole 5 of the rotor member 4 at the partial region 5A greater than the fitting strength at the remaining region 5B of the same. Instead of this, the diameter of the partial region 6A can be made equal to the diameter of the other region 6B; but, by changing the material or the physical property such as hardness to be different between the partial region 6A and the other region 6B, the fitting strength of the through hole 5 of the rotor member 4 at the partial region 5A can be made greater than the fitting strength at the remaining region 5B of the same.

INDUSTRIAL APPLICABILITY

The present invention is widely applicable to various types of fluid pump.

REFERENCE SIGNS LIST 1 fluid-pump rotor
2 inner rotor 3 outer rotor
4 rotor member
5 through hole
5A partial region (first hole region)
5B remaining region (second hole region)
6 shaft member
6A partial region (first shaft region)
6B other region (second shaft region)
10 outer circumferential face (tooth flank)
21 large diameter portion
23 guide portion
24 small diameter portion
25 serration portion

The invention claimed is:

1. A structure for fixing a shaft member in a rotor member for a fluid pump, wherein
the rotor member has a cylindrical shape with a toothed portion in an outer circumferential face and a through hole along a rotational axis,
the shaft member is fitted in the through hole,
a first hole region and a second hole region are provided in an inner face of the through hole of the rotor member, the first hole region extending along a rotational axis of the rotor member from a first end face of the rotor member perpendicular to the rotational axis, the second hole region continuing from the first hole region to a second end face opposite to the first end face of the rotor member,
fitting strength between the first hole region and a first shaft region provided in an outer face of the shaft member is set greater than fitting strength between the second hole region and a second shaft region provided in the outer face of the shaft member, and
the outer circumferential face of the rotor member has a tapered shape inclined relative to the direction of the rotational axis, an outer diameter of the rotor member at the second end face being greater than an outer diameter of the rotor member at the first end face.

2. The structure according to claim 1, wherein the first shaft region includes in a circumferential direction a serration portion having a plurality of groove portions extending along the direction of the rotational axis.

3. The structure according to claim 2, wherein:
the shaft member is insertable into the through hole from one direction; and
in the second shaft region, there is formed a guide portion which is inserted into the through hole prior to the serration portion and which is formed at an area which comes into contact with the inner face of the through hole simultaneously with at least a part of the serration portion when the shaft member is engaged and assembled to the rotor member.

4. The structure according to claim 3, wherein the guide portion comprises a cylindrical face formed around the rotational axis.

5. The structure according to claim 3, wherein the guide portion is tapered such that its diameter progressively decreases toward a leading end of the shaft member.

6. The structure according to claim 3, wherein the serration portion is tapered such that its diameter progressively decreases toward a leading end of the shaft member.

7. The structure according to claim 3, wherein the serration portion is tapered such that its diameter step-wisely decreases toward a leading end of the shaft member.

8. The structure according to claim 2, wherein:
a stepped portion is provided between the first hole region and the second hole region;
a guide portion is formed in the second shaft region to be inserted into the through hole prior to the serration portion; and
an inside diameter of the second hole region is greater than an outside diameter of the guide portion.

9. The structure according to claim 1, wherein:
the rotor member comprises a sintered body;
the first hole region of the rotor member radially expands with the engagement of the shaft member to ease the inclination of the outer circumferential face of the rotor member; and
the outer diameter of the rotor member at the first end face is smaller than the outer diameter of the rotor member at the second end face after the rotor member radially expands at the first hole region.

10. The structure according to claim 1, wherein the second hole region of the through hole is out of contact with the second shaft region of the shaft member.

11. The structure according to claim 1, wherein the first shaft region and the second shaft region are different from each other in material or hardness.

12. An inner rotor of an inscribed gear pump, comprising:
a rotor member having a cylindrical shape with a toothed portion in an outer circumferential face and a through hole along a rotational axis;
a shaft member fitted in the through hole;
a first hole region and a second hole region provided in an inner face of the through hole of the rotor member, the first hole region extending along a rotational axis of the rotor member from a first end face of the rotor member perpendicular to the rotational axis, the second hole region continuing from the first hole region to a second end face opposite to the first end face of the rotor member;
fitting strength between the first hole region and a first shaft region provided in an outer face of the shaft member being greater than fitting strength between the second hole region and a second shaft region provided in the outer face of the shaft member;
the outer circumferential face of the rotor member having a tapered shape inclined relative to the direction of the rotational axis, an outer diameter of the rotor member at the second end face being greater than an outer diameter of the rotor member at the first end face.

* * * * *